3,440,867
APPARATUS FOR MEASURING THE FLEXIBILITY OF THIN MATERIAL
John Karel Prall and John David Fillmore, Chertsey, England, assignors to Lever Brothers Company, New York, N.Y., a corporation of Maine
Filed Mar. 3, 1966, Ser. No. 531,602
Claims priority, application Great Britain, Mar. 12, 1965, 10,513/65
Int. Cl. G01n 29/00
U.S. Cl. 73—67.1               3 Claims

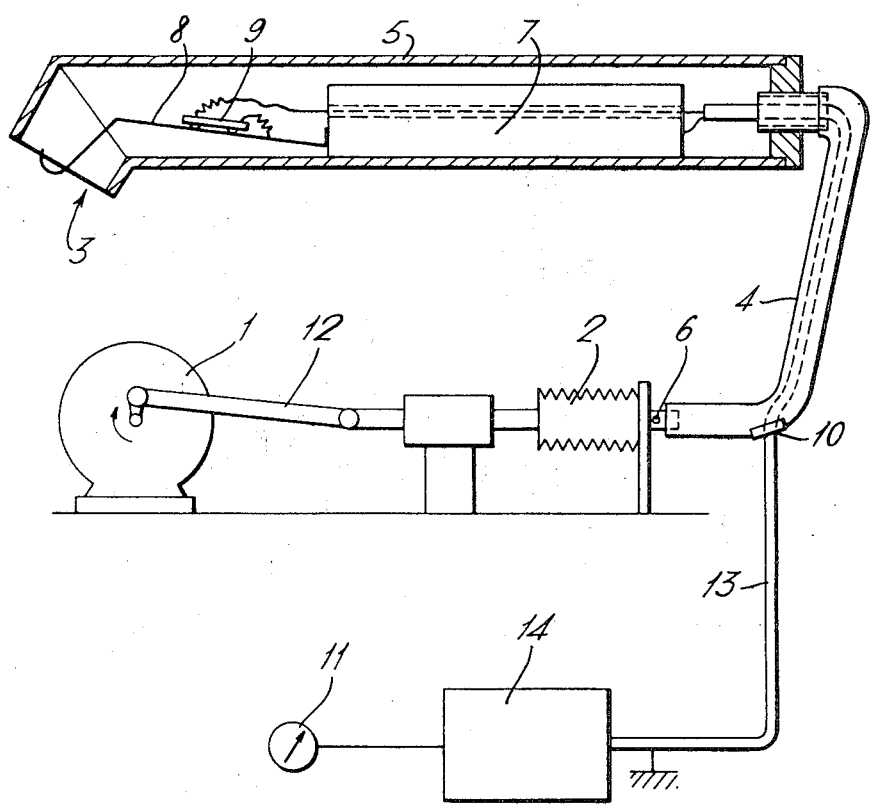

ABSTRACT OF THE DISCLOSURE

Flexibility measurements are made of skin or other thin elastic layers by (a) placing adjacent an area of the layer the open end of a tube enclosing a column of air and making at least partially at said end a peripheral air-retaining seal with said layer, (b) setting such air column into vibration to thereby impart corresponding vibration to said layer area, and (c) contacting said area by the end of an instrument disposed within the tube and adapted to measure the amplitude of vibration of such layer area.

---

The present invention relates to the non-destructive measurement of flexibility of thin elastic layers, for example sheets of plastics material or portions of the human skin which have to be measured in situ by the medical practitioner or cosmetician.

With such layers, particularly human skin, it is desirable that when measuring the properties of the layer, the act of measuring should not itself alter the properties being measured. For example if the flexibility of skin is to be measured and this involves placing a probe on the skin, the moisture content of that portion of the skin in contact with the probe will increase and result in an inaccurate reading being obtained.

The present invention is concerned with this problem and provides a device for measuring the flexibility of a thin elastic layer comprising a tube enclosing a column of air, and means for applying a controlled vibration to said air column, the tube having an open end which may be applied to an area of said layer to impart vibrations thereto and enclosing a measuring element which is arranged to measure the amplitude of vibrations imparted to said layer.

The invention also provides a method of measuring the flexibility of a thin elastic layer comprising applying a controlled pneumatic vibration to an area of said layer and measuring the amplitude of vibrations applied thereto.

The principal advantage of the invention is that the area being measured will in the main, apart from a small area which may be covered by said measuring element, be only in contact with air and so the properties being measured will remain almost unaltered by the measuring operation.

It is important that there should be good seal between the open end of the tube and the area being measured. This may be achieved by an annular suction ring or by means of a sealing grease or a suitable adhesive.

Preferably vibration is applied to the air column in the tube, by applying vibration to the other end of the tube. This may, for example, be applied by means of a vibrating bellows.

Measurement of the amplitude of vibrations may be effected by an electro-mechanical transducer, optically or by other known devices for converting a mechanical movement to an output signal.

An embodiment of the invention will not be described by way of example with reference to the accompanying diagram.

A synchronous electric motor 1 is connected to a flexible metal bellows 2 by means of a crank arm 12, movement of which produces vibration of the bellows 2. The bellows is connected via a tube 4 to a probe 5 consisting of a perspex tube having an orifice 3 at one end, weighted by a brass rod 7 and bored to accommodate an electric coaxial cable 13 and also to allow movement of the air column. A very thin flexible leaf spring 8 situated within the orifice 3 is attached at one end to the brass rod 7 and at the other end is cranked and shaped to rest lightly on the surface to be measured.

A piezo electric transducer 9 is connected to receive movement from the spring 8 and convert this into an electrical signal which is carried away by the coaxial cable 13. The coaxial cable 13 is led away within the tube 4 and passes out via an air-tight gland 10 to a unit 14 which converts the electrical signal from the transducer into a D.C. output which can be read by a meter 11.

In operation the frequency of vibration of the air column is determined by the speed of the motor 1. Amplitude of vibration is controlled by an air bleed 6 or by adjusting the stroke of the crank 13. The size of the probe head orifice 3 is determined by the area to be measured and for human skin is typically half an inch outside diameter.

The meter can be calibrated by placing the probe over a rotating cam which provides a known displacement of the transducer.

In practice a medical practitioner might use the instrument to detect a variation from a known value of skin flexibility for a particular patient as an aid to diagnosis, or a cosmetician might use the instrument to determine the type of skin and hence suitable cosmetics to be used by a particular client. The instrument may also be used for measuring the flexibility of sheet materials such as plastics, rubber or the like.

What is claimed is:
1. A device for measuring the flexibility of a thin elastic layer comprising a tube enclosing a column of air, means for applying a controlled vibration to said air column, the tube having an open end which may be applied to an area of said layer to expose said area to the vibration of said column so as to set said area into vibration, a vibratable member mounted centrally in said tube to yieldably project outwards of said open end, said member being engageable with said layer to under- go a vibration corresponding to that of said layer, and transducer means mechanically coupled to said member and responsive to the vibration thereof to derive from such vibration a signal representative of the amplitude of vibration of said layer.

2. A device according to claim 1 in which said means for applying a controlled vibration to said air column is comprised of a vibratory bellows.

3. A device according to claim 1 in which said transducer means comprises an electro-mechanical transducer, and in which said vibratable member comprises a crank arm which is shaped to rest lightly on the layer area to be measured and to transmit vibrations to said transducer.

References Cited
UNITED STATES PATENTS

| | | | |
|---|---|---|---|
| 2,682,167 | 6/1954 | Gamarekian | 73—67.3 |
| 2,981,096 | 4/1961 | Carrell | 73—67.1 |

RICHARD C. QUEISSER, *Primary Examiner.*

J. P. BEAUCHAMP, *Assistant Examiner.*

U.S. Cl. X.R.

73—80; 128—2